July 28, 1936.

G. B. WARREN 2,049,343

BEARING AND THE LIKE

Filed May 31, 1934

Inventor:
Glenn B. Warren,
by Harry E. Dunham
His Attorney.

Patented July 28, 1936

2,049,343

UNITED STATES PATENT OFFICE 2,049,343

BEARING AND THE LIKE

Glenn B. Warren, Schenectady, N. Y., assignor to General Electric Company, a corporation of New York Application May 31, 1934, Serial No. 728,244

3 Claims. (Cl. 308—9)

The present invention relates to bearings and the like for supporting or guiding rotary shafts in which fluid is conducted to the bearing surface to reduce friction and wear between the shaft and the bearing surface. The invention is of special importance where fluids of poor or no lubricating properties are used.

One object of my invention is to provide an improved construction and arrangement for bearings whereby the shaft is prevented from rubbing or directly engaging any portion of the bearing surface without the use of ordinary lubricants.

This is accomplished according to my invention by the provision of means for conducting fluid to several circumferentially spaced recessed portions of the bearing surface. This fluid, which may be mercury, water, or any other kind of fluid adapted for reducing friction, spreads to maintain an annular clearance between the bearing surface and the shaft, thereby holding the shaft in a floating state. The bearing according to my invention preferably has a bearing surface with at least three or more separate circumferentially spaced recesses. Fluid is conducted to these recesses at substantially uniform pressure through orifice plugs or the like. With such an arrangement the fluid prevents the rotary member or shaft from forming a metal-to-metal contact with the bearing surface of the stationary member. During movement of the shaft, for instance, due to a change of load, fluid pressure is automatically built up in certain of the recesses to counteract the forces acting on the shaft.

For a better understanding of what I believe to be novel and my invention, attention is directed to the following description and the claims appended thereto in connection with the accompanying drawing which forms a part of my specification.

Figure 1:
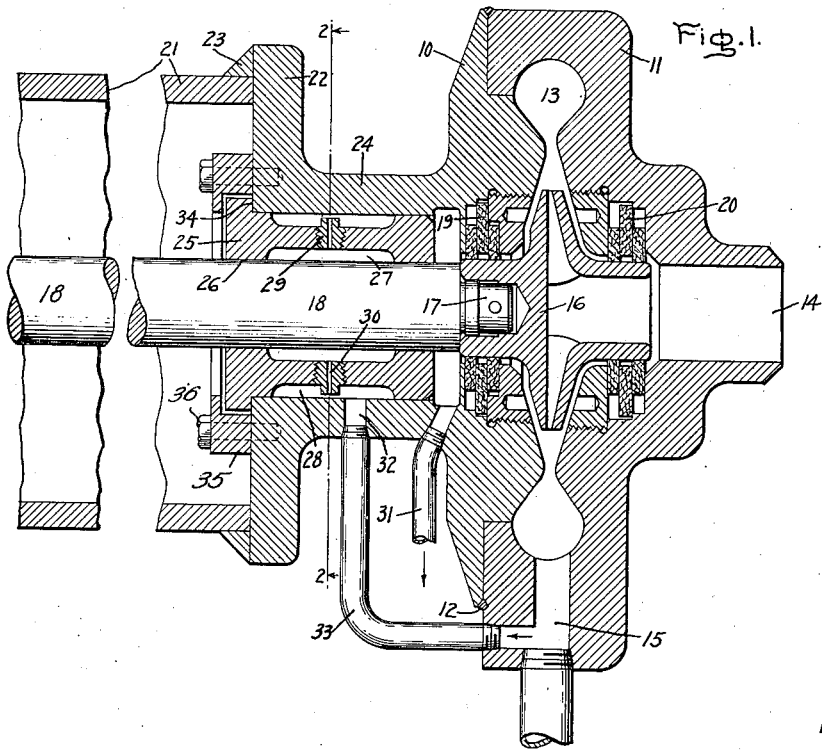
Figure 2:
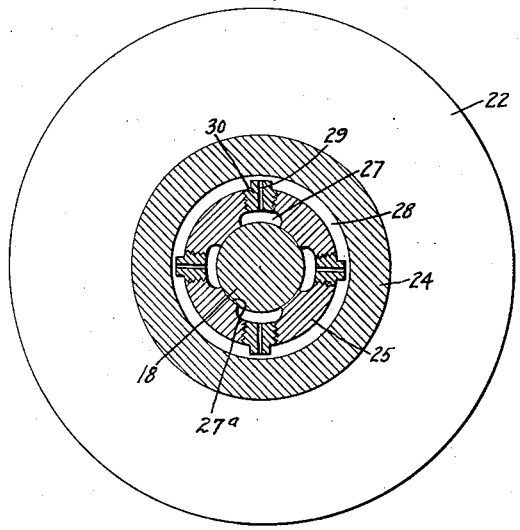
Figure 3:
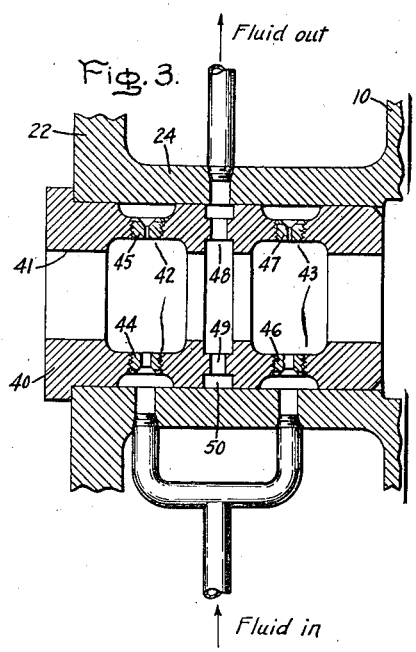

In the drawing, Fig. 1 represents an arrangement embodying my invention; Fig. 2 is a sectional view along line 2—2 of Fig. 1; and Fig. 3 shows a modification according to my invention.

In the arrangement of Figs. 1 and 2, I have illustrated my improved bearing in connection with a pump for conveying mercury or like fluid at high pressure. The pump has an outer casing comprising two halves 10 and 11 united by a weld 12. The casing defines a pump chamber 13 having an inlet or suction opening 14 and an outlet or discharge opening 15. An impeller 16 fastened to an overhung portion 17 of a rotary shaft 18 is disposed within the pump chamber. Packings 19 and 20 are provided between hub portions of the impeller and the pump casing to minimize leakage of fluid to be conveyed. These packings are more fully disclosed in my copending application, Serial No. 699,717, filed November 25, 1933. During operation fluid is sucked into the inlet opening and forced by the impeller at high pressure into the outer region of the pump casing 13, whence the fluid is discharged through the discharge opening 15. The shaft 18 for supporting the impeller may form a part of a prime mover such as a turbine or a motor. In the present instance I have shown a casing portion 21 of a prime mover for supporting the pump casing. To this end the casing half 10 of the latter has a flanged portion 22 secured by a weld 23 to the casing 21 of the prime mover.

Referring now to the bearing arrangement which forms the object of my invention, the bearing support in the present instance is formed by a necked-in portion 24 of the casing half 10. Concentrically arranged and engaging the inner surface of the necked-in portion 24 is a bearing sleeve 25 having a bearing surface 26 for supporting or guiding the shaft 18. The bearing surface 26 in accordance with my invention has a plurality of circumferentially spaced apart separate grooves or recesses. In the present instances I have shown four shallow recesses 27 provided at 90 angular degrees apart and forming bands 27ª intermediate adjacent recesses. Fluid is conducted to the recesses 27 from an annular chamber 28 defined by a recess in the outer surface of the sleeve 25 and the inner surface of the necked-in portion 24. Each recess 27 is connected to the chamber 28 by an orifice plug 29 screwed into a radial hole in the sleeve 25 to insure uniform flow to all recesses under normal operating conditions. Each plug has an orifice made of such a size as will cause a large pressure drop of the fluid forced through it. As long as the shaft is in concentric relation with the bearing surface the same amount of fluid flows through all of the orifice plugs. However, if the shaft is forced out of the center the flow of fluid through the orifices is reduced on the section of the bearing nearest the shaft. This reduction in flow automatically causes a rise in pressure in the corresponding recesses, thereby creating a force to hold the shaft in a new position. At the same time a drop in pressure takes place in the recesses opposite the recesses in which pressure has been built up. Both the drop in pressure on one side of the shaft and the rise in pressure on the diametrically opposite side of the shaft are adapted to hold the shaft in its new position. Thus the shaft under all conditions is prevented from making a metal-to-metal contact with the bearing surface by the fluid under pressure supplied to the recesses and spreading therefrom in all directions. The fluid is discharged from the bearing through means including a conduit 31 secured to an opening in the casing half 10 and fluid is conducted to the chamber 28 through an opening 32 in the casing half 10 by means of a conduit 33 from any suitable source. In the present instance where the bearing is provided in connection with a mercury pump, mercury contained in the pressure chamber of the pump is used as a fluid to reduce friction of the shaft on the bearing surface and to prevent metal-to-metal contact between them, that is, to maintain the shaft in a floating state in the bearing. To this end the conduit 33 is connected to the discharge opening 15 of the pump. Axial movement of the bearing sleeve is prevented by a shoulder 34 engaging the flange 22 of the casing half 10 and a plate 35 fastened to the flange portion 22 by bolts 36.

In the arrangement of Figs. 1 and 2 a single set of circumferentially spaced apart recesses 27 is provided in the bearing surface. In cases where the bearing is of considerable length it may be desirable to provide a plurality of sets of recesses or slots axially spaced apart, in which cases means must be provided for discharging fluid between adjacent sets of recesses. Furthermore, where a considerable static load acts in a definite direction on the bearing surface it may be desirable to provide plugs with different sized orifices for conducting fixed different amounts of fluid to different portions of the bearing surface. Such an arrangement is indicated in Fig. 3. It comprises a sleeve 40 corresponding to the sleeve 25 of Fig. 1 and has a bearing surface 41 provided with two sets of grooves 42 and 43 axially spaced apart. Each set includes at least three or more circumferentially spaced apart grooves or recesses. Fluid is conducted to the grooves by orifice plugs 44, 45, 46, and 47. The orifices in the plugs 44 to 47 inclusive insure a predetermined flow of fluid to the grooves 42 and 43 respectively. In the present instance the plugs 44 and 46 have somewhat wider orifices than the plugs 45 and 47, whereby more fluid is conducted to the lower grooves 42 and 43 than to the upper grooves 42 and 43. This is desirable where the bearing is subjected to a considerable static load. The fluid as in the case described above spreads in all directions and is discharged by means including an annular groove 48 formed in the bearing surface intermediate the two sets of grooves and connected through bores 49 to a discharge chamber 50 which latter is formed by an annular groove in the outer surface of the sleeve 40.

Having described the method of operation of invention together with the apparatus which I now consider to represent the best embodiments thereof, I desire to have it understood that the apparatus shown is only illustrative and that the invention may be carried out by other means.

What I claim as new and desire to secure by Letters Patent of the United States, is:

1. In a shaft bearing, a sleeve for supporting a shaft having a bearing surface with a plurality of axially spaced apart sets of circumferentially spaced grooves, means for separately conducting liquid under pressure to each groove to form a film of liquid between the bearing surface and a shaft supported thereon.

2. In a shaft bearing, a sleeve for supporting a shaft having a bearing surface with a plurality of axially spaced apart sets of circumferentially spaced grooves, means for separately conducting liquid under pressure to each groove to form a lubricating film on the bearing surface, and means for discharging liquid from the bearing comprising an annular recess formed in the bearing surface intermediate adjacent sets of grooves and a radial bore connected to the annular recess.

3. The combination of a mercury pump having an impeller and a horizontal shaft for supporting the impeller, a bearing for supporting the shaft, the bearing having a bearing surface with at least three circumferentially substantially uniformly spaced separate grooves, and means including orifice plugs for separately conducting mercury under pressure from the pump to each of the grooves to hold the shaft in a floating state.

GLENN B. WARREN.